(No Model.)
R. McL. & A. McDONALD.
ELECTRIC BATTERY.
No. 543,885. Patented Aug. 6, 1895.
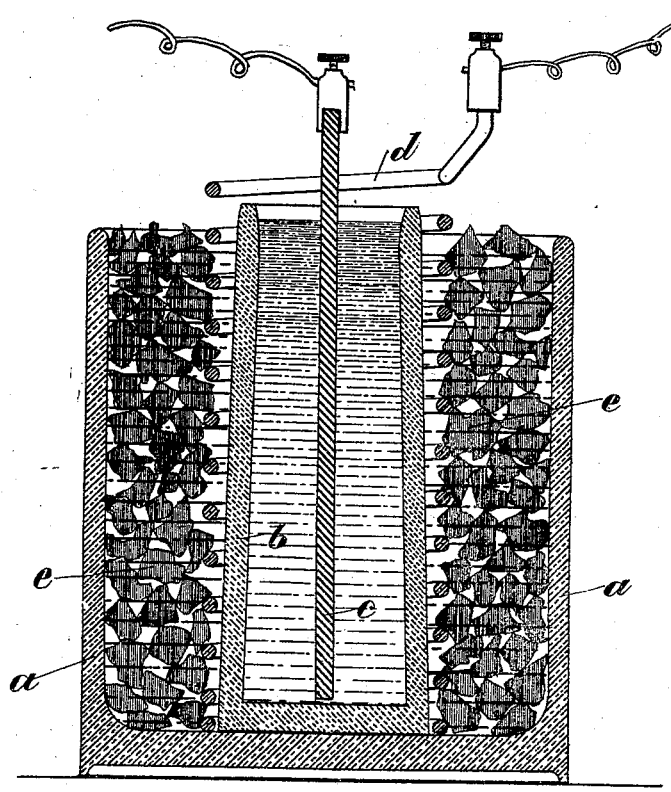
Witnesses
H. van Oldenneel
E. K. Sturtevant
Inventors
Robert McLauchlin McDonald
Alexander McDonald
by [signature]
their Attorneys

UNITED STATES PATENT OFFICE.

ROBERT McL. McDONALD AND ALEXANDER McDONALD, OF DALMUIR, SCOTLAND.

ELECTRIC BATTERY.

SPECIFICATION forming part of Letters Patent No. 543,885, dated August 6, 1895.

Application filed November 13, 1894. Serial No. 528,683. (No model.) Patented in England May 3, 1894, No. 8,808.

*To all whom it may concern:*

Be it known that we, ROBERT McL. McDONALD and ALEXANDER McDONALD, subjects of the Queen of Great Britain, and residents of Dalmuir, Dumbartonshire, Scotland, have invented certain new and useful Improvements in Electric Batteries, (for which I have obtained a patent in England, dated May 3, 1894, No. 8,808,) of which the following is a specification.

This invention relates to electric batteries, and it has for its object to improve their construction; and in order that our said invention may be properly understood we have hereunto appended an explanatory drawing which shows the battery in section.

$a$ is the outer cell or containing-vessel, which may be made of glass, earthenware, ebonite, or other suitable material.

$b$ is the inner porous cell.

The battery consists of a zinc plate $c$ or a zinc rod or cylinder which, as usual, is placed in the porous cell $b$.

A vertical copper spiral $d$ surrounds the porous cell $b$, and between this spiral and the cell $a$ coal-cinders $e$, pieces of coke, or like porous carbonaceous and absorbent material is packed.

Although the arrangement will work very satisfactorily with any of the fluids commonly used in ordinary batteries, we prefer to use within the porous cell a solution of sodium chloride and within the outer cell a solution of copper sulphate.

The battery when constructed in the manner aforesaid and charged with chloride of sodium and copper sulphate is found to have the merits of cheapness, power, and constancy.

The cinders being very porous and absorbent condense or absorb the gases evolved, and, as a consequence, no fumes are emitted, while polarization is prevented.

As the copper spiral retains the cinders in place, the porous cell with the zinc element can be removed at any time without injuring the battery.

In the case of single fluid-cells a plug can be inserted in the top of the copper spiral and the zinc element suspended from it.

As a result of the action set up in the battery, the cinders or like material become plated or coated with a thin film of copper and the internal resistance is decreased, thereby increasing the current.

The copper spiral on account of its conductivity is found to lessen the internal resistance.

It is to be understood that we may use, if desired, any other suitable and well-known fluids besides chloride of sodium solution and copper sulphate solution.

The porous carbonaceous material is used in pieces or lumps.

The copper sulphate may be used in the form of crystals.

Having now fully described our invention, what we claim, and desire to secure by Letters Patent, is—

1. In combination, in a battery cell, the outer jar, the positive element, the porous pot, the cinders or like carbonaceous material constituting the negative element packed between the same and the wall of the jar and a copper spiral $d$ between said pot and the cinders, said spiral serving as a conductor and as a means for holding the cinders in place and away from and out of contact with the porous pot substantially as described.

2. In combination in a battery cell, the outer jar, the inner electrode, the porous cup surrounding the same, the cinders within the jar, and the spiral around the porous cup, said spiral acting as a conductor and serving to retain the cinders in place, said cinders being supported between the spiral and the jar, substantially as described.

3. In combination in a battery cell, the outer jar containing the solution of sulphate of copper, the inner porous cell containing the chloride of sodium, the electrode in the porous cell, the cinders in the outer jar and the spiral conductor around the porous cell arranged to hold the cinders in place, said cinders being supported between the spiral and the jar, substantially as described.

Signed at Glasgow, Scotland, this 20th day of October, A. D. 1894.

R. McL. McDONALD.
ALEXANDER McDONALD.

Witnesses:
HUGH FITZPATRICK,
WILLIAM FLEMING.